Sept. 26, 1961  L. A. WEISS  3,001,716
THRUSTMETER
Filed Oct. 26, 1954
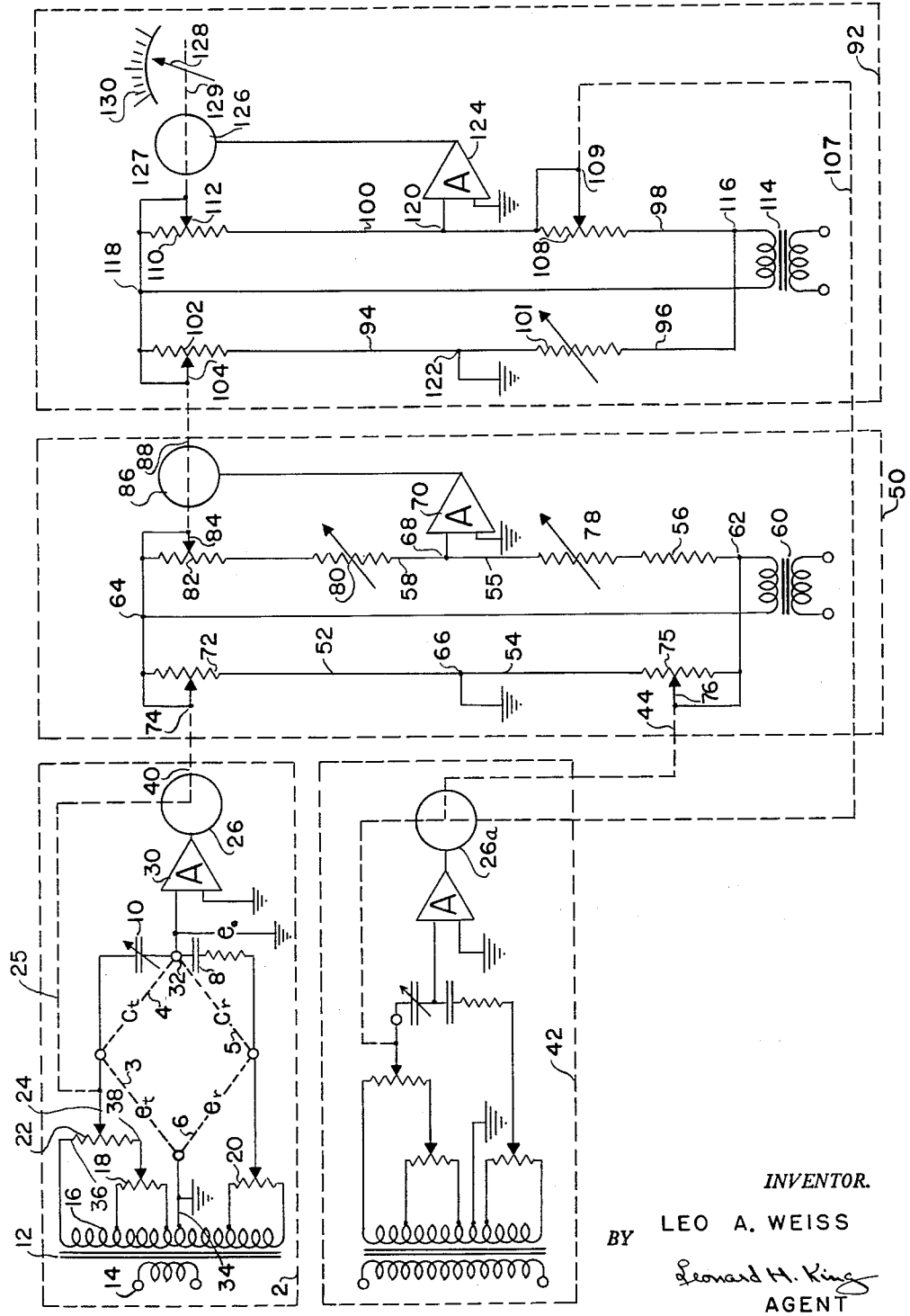
INVENTOR.
LEO A. WEISS
BY
Leonard H. King
AGENT 3,001,716
THRUSTMETER
Leo A. Weiss, Kings Point, N.Y., assignor to Avien, Inc., Woodside, N.Y.
Filed Oct. 26, 1954, Ser. No. 464,685
1 Claim. (Cl. 235—193)

This invention relates to analogue computers and in particular a thrustmeter for measuring the thrust of a jet engine.

In the operation of jet powered aircraft, it is essential that the pilot have accurate information of the thrust of his engine. For example, he requires knowledge as to whether the thrust is adequate for take-off and also thrust information so that he may control the operation of the craft while airborne for optimum fuel consumption.

The gross thrust, $F_g$, developed by fixed area exhaust nozzle types of jet engines can be expressed as follows:

$$F_g = \frac{2\gamma}{\gamma-1} K_t A P_a \left[ \left(\frac{P_t}{P_a}\right)^{\frac{\gamma-1}{\gamma}} - 1 \right]$$

$F_g$ = thrust in pounds

Where $K_t$ = a constant depending on the particular engine,
$\gamma$ = ratio of specific heat under constant pressure to that under constant volume of the jet exhaust gases.
$A$ = area of exhaust nozzle in square inches.
$P_a$ = absolute ambient pressure in p.s.i.
$P_t$ = absolute pressure in the tailpipe in p.s.i.

The value of $\gamma$ is nearly constant, and equal to 1.33. Then $$F_g = 8.06 K_t A P_a \left[ \left(\frac{P_t}{P_a}\right)^{0.248} - 1 \right]$$

A pair of transducers are employed to measure absolute ambient and tailpipe pressure, i.e., $P_a$ and $P_t$. Equipment is, therefore, required which will interpret the output of the transducers in terms of thrust in accordance with the above equation. An analogue computer for accomplishing this computation which would be practical to install and operate aboard a jet aircraft must meet stringent requirements including space, weight, stability and vibration requirements. A computer which meets these requirements is disclosed hereinafter.

It is an object of this invention to provide a compact analogue computer.

It is another object of this invention to provide a computer capable of determining functions of a plurality of variables raised to a power.

It is a particular object of this invention to provide an improved thrust measuring apparatus.

Another object is to provide a pressure measuring circuit controlling a shaft whose change in angular position is directly proportional to corresponding changes in the pressure under measurement.

Another object of this invention is to provide a measuring device having independent adjustments for maximum and minimum values of the condition to be measured.

An object of this invention is to provide a thrustmeter having independent adjustments for minimum and maximum pressures to be measured.

Other objects and advantages will become apparent from consideration of the following discussion taken in conjunction with the accompanying drawings.

In the drawing there is shown schematically the apparatus of this invention.

In the drawing there is shown a bridge circuit 2 of the self-balancing type used for the measurement of pressure in conjunction with a capacitor type of transducer sensing the said pressure. A feature of this bridge is that its output shaft rotation, $\theta$, is directly proportional to the pressure under measurement. Another feature of this bridge arrangement is the immunity of measurement to power supply voltage variations.

As symbolized by the dashed lines, 3, 4, 5 and 6, the circuit consists of a four arm bridge, two adjacent arms being the source of potential $e_t$ and $e_r$; the other two consisting of two capacitances $C_t$ and $C_r$. Capacitance $C_r$ is a fixed reference capacitor 8 while $C_t$ represents the capacitance of transducer 10. The voltages $e_t$ and $e_r$ are obtained from a transformer 12 with its primary winding 14 connected to a source of alternating power. The voltage $e_t$ in series with the transducer 10 is variable, and is obtained from the secondary winding 16 of the transformer through an adjusting or calibration potentiometer 18 and a rebalancing potentiometer 22. The voltage $e_r$ in series with the reference capacitor 8 is obtained through a calibration potentiometer 20. A motor 26 sensitive to polarity or phase is mechanically coupled through a suitable device, such as a gear train, or a worm drive, to the wiper 24 of the rebalancing potentiometer 22. Thus, the angular position $\theta$ of the potentiometer wiper 24 determines the value of the voltage $e_t$. Since the shaft 25 of motor 26 is coupled to the wiper 24 of the rebalancing potentiometer 22, it follows that the voltage $e_t$ is controlled by the angular position of shaft 25 of motor 26.

An amplifier 30 of the electronic or electromagnetic type is connected to the signal terminals 32 and 34 of the bridge, across which a voltage $e_o$ may appear. In general, the bridge is considered to be balanced when $e_o$ is zero. If the bridge is not balanced, the small voltage $e_o$ is amplified by the amplifier 30 and fed into the motor 26. The polarity of the voltage $e_o$ is such that the motor 26 will rotate the wiper 24 of the rebalancing potentiometer 22 in a direction that will change $e_t$ to a value required for balance.

The balance conditions of the bridge require that $$\frac{e_t}{e_r} = \frac{C_r}{C_t} \qquad (1)$$

Further, the capacitance $c_t$ of the transducer is inversely proportional to the absolute pressure P, which is to be measured, letting $$C_t = \frac{K_t}{d_0 - K_d P} \qquad (2)$$

where $K_t$ is a constant of proportionality depending on the geometry and the physical constants of the transducer, $d_0$ is the spacing between the transducer plates at zero pressure, and $K_d$ is the deflection constant of the transducer bellows, the substitution of $C_t$ as given by Equation 2 in Equation 1 provides Equation 3 as follows:

$$e_t = \frac{C_r(d_0 - K_d P)}{K_t} = \frac{e_r C_r d_0}{K_t} - \frac{e_r C_r K_d}{K_t} P \qquad (3)$$

Equation 3 may be rewritten for $e_t = e_{t\ max}$ in which case $P = 0$. Then $$e_{t\ max} = \frac{e_r C_r d_0}{K_t} \qquad (4)$$

It follows from Equations 3 and 4 that $$e_{t\ max} - e_t = \left(\frac{e_r C_r K_d}{K_t}\right) P \qquad (5)$$

But $$\frac{\theta}{\theta_{max}} = \frac{e_{t\ max} - e_t}{e_{t\ max} - e_{t\ min}} \qquad (6)$$

where $\theta$ max is the total angular sweep of the wiper 24, and $e_{t\ min}$ is the value of $e_t$ when the wiper 24 is at the lowest end of the rebalancing potentiometer 22.

It follows from 5 and 6 that $$\theta = \frac{\theta_{max} e_r C_r K_d}{K_t(e_{t\ max} - e_{t\ min})} P = \frac{\theta_{max} C_r K_d}{K_t\left(\frac{e_{t\ max}}{e_r} - \frac{e_{t\ min}}{e_r}\right)} P$$

Hence, $\theta$ is directly proportional to $P$.

It is further noted that $e_t$ is a linear function of $\theta$, and that the ratios $$\frac{e_{t\ max}}{e_r}$$

and $$\frac{e_{t\ min}}{e_r}$$

depend only on the turns ratio of the transformer 12 and not on the supply voltage. Hence, if the calibrating potentiometer 18 is properly set, so that the wiper 24 is at the end 36 of the potentiometer 22 when the transducer is exposed to zero absolute pressure (i.e. vacuum), the angular position $\theta$ of the wiper 24 is proportional to $e_t$ and, in accordance with Equation 3, $\theta$ is proportional to the pressure $P$, under measurement.

The calibrating potentiometer 18 adjusts the minimum value of the potential $e_t$ when the wiper 24 is at the end 38 of the rebalancing potentiometer 22. It should be noted that the maximum value of $e_t$, obtained when the wiper 24 is at the position 36 of the rebalancing potentiometer, is independent of the setting of the calibrating potentiometer 20, so that the adjustment of the calibrating potentiometer 20 does not affect the setting of the calibrating potentiometer 18 as mentioned above.

Rotation of motor 26 actuates both shafts 25 and 40 so that the angular position of 40 is also proportional to the pressure $P_t$, under measurement.

Bridge circuit 2 may be used to detect the absolute pressure in the tail pipe of a jet exhaust while a similar circuit 42 is used to measure the ambient pressure. The angular position of shaft 44 will accordingly be proportional to the ambient pressure $P_a$.

Thus there is available two shafts whose angular positions represent the pressures $P_a$ and $P_t$.

A Wheatstone bridge circuit 50 is used as an analogue computor to calculate the ratio between $P_t$, the absolute pressure in the tail pipe, and $P_a$, the absolute ambient pressure. Wheatstone bridge circuit 50 is composed of four arms 52, 54, 55, and 58 in series. The bridge is energized by transformer 60 connected between an A.C. power source and points 62 and 64. The bridge is provided with a pair of output terminals 66 and 68 across which is connected amplifier 70.

Arm 52 consists of a linear variable resistance element 72, the resistance of which varies in accordance with position of arm 74. The position of the arm is, in turn, controlled by shaft 40. Accordingly, the resistance of arm 52 of the bridge is proportional to the tail pipe pressure $P_t$. Likewise arm 54 contains variable resistor 75 whose resistance is controlled by movable arm 76 which is, in turn, actuated by shaft 44 so that the resistance of arm 54 of bridge 60 is proportional to the ambient pressure $P_a$. Arm 55 is provided with fixed resistor 56 and an adjustable resistance element 78 which is used to obtain an adjustment for maximum ratio. Arm 58 includes an adjustable resistance element 82 which is provided with a movable arm 84 controlled by motor 86. Motor 86, in turn, is under the influence of amplifier 70 and will operate only when a signal is applied by amplifier 70, i.e., when the bridge 50 is not balanced.

Thus by varying the resistance of element 82, the bridge 50 may be electrically balanced, at which time motor 86 is at rest. In addition to actuating arm 84, motor 86 actuates shaft 88. To adjust bridge 50 movable arms 74 and 76 are positioned to simulate a high ratio of $P_t$ to $P_a$. Then rheostat 78 in arm 56 is varied until movable arm 84 moves to one end of rheostat 82. For adjustment of the bridge for minimum ratio readings, movable arms 74 and 76 are positioned to stimulate a low $P_t$ to $P_a$ ratio. Then rheostat 80 in arm 58 is varied until movable arm 84 moves to the other end of rheostat 82. Alternate adjustment of rheostats 80 and 78 will have to be effected until the bridge is balanced. The angular position of shaft 88 is proportional to the ratio $$\frac{P_t}{P_a}$$

The output of bridge 50, namely: the ratio $$\frac{P_t}{P_a}$$

in terms of angular shaft position, is then introduced to a second self-balancing Wheatstone bridge circuit 92.

Bridge 92 is provided with four series connected arms 94, 96, 98, and 100.

Bearing in mind that the equation to be solved is $$F_g = 8.06 K_t A P_a \left[\left(\frac{P_t}{P_a}\right)^{0.248} - 1\right]$$

we may now consider the circuit of this second Wheatstone bridge.

Let $R_{94}$, the resistance of arm 94
$R_{96}$, the resistance of arm 96
$R_{98}$, the resistance of arm 98
$R_{100}$, the resistance of arm 100 then in accordance with the relationship between arms of a Wheatstone bridge $$\frac{R_{94}}{R_{96}} = \frac{R_{100}}{R_{98}}$$

or $$R_{100} = \frac{(R_{94})(R_{98})}{R_{96}}$$

Arm 94 includes a variable rheostat having an element wound or shaped so as to produce an output which varies with change in angular position of shaft 88 according to the function:

$$f\left(\frac{P_t}{P_a}\right) = \left[\left(\frac{P_t}{P_a}\right)^{0.248} - 1\right]$$

Arm 96 includes rheostat 101 which may be preset to provide the constant multiplying term, 8.06 $K_t A$.

Thus, the finally adjusted resistance of element 110 corresponds to $F_g$, the thrust.

The value, 8.06 $K_t A$ is fixed by the value of the resistance of arm 96. Shaft 107 is coupled to motor 26a and varies the position of the wiper 109 of rheostat 108 to introduce the $P_a$ term.

The bridge is energized from an A.C. source through transformer 114 which is connected to the bridge at junctions 110 and 116.

The output of bridge circuit 92 is detected across junctions 120 and 122 by amplifier 124. The output of the amplifier operates motor 126 which, through shaft 127, adjusts variable arm 112 of rheostat 110 to adjust the resistance of arm 100 so as to balance the bridge. Motor 126 through shaft 129 also varies the position of pointer 128 of indicator 130. Thus the position of pointer 128 is proportional to the thrust, $F_g$.

A pressure sensing element suitable for use in the apparatus of this invention is disclosed in the copending application of Martin Ruderfer entitled, "Transducer," filed concurrently herewith, which issued as Patent Number 2,714,703 on August 2, 1955 and assigned to the assignee of the present invention.

The formula given earlier for thrust, i.e.

$$F_g = \frac{2\gamma}{\gamma-1} K_t A P_a \left[ \left(\frac{P_t}{P_a}\right)^{\frac{\gamma-1}{\gamma}} - 1 \right]$$

is presently considered by experts in the field as accurate. It is to be understood, however, that the usefulness of this invention is not necessarily dependent upon the correctness of this formula, nor is it necessarily limited to the measurement of thrust. The invention applied equally well to any formula which can be expressed exactly or with reasonable approximation in the same mathematical form.

The voltage responsive means controlling the motors may be an amplifier of the electron tube, transistor or magnetic types.

While I have discussed the application of the invention to a jet exhaust engine, be it understood that this invention applies to devices for continuously measuring and indicating the thrust of other reaction engines such as ram jets, turbo jets, rockets, guided missiles and the like.

While I have disclosed the best mode contemplated of carrying out the invention, be it understood that further modification and changes may be made within the scope of the appended claims.

What is claimed is:

Computer means for providing an indication related to a first and a second condition to be sensed comprising: a first variable capacitor arranged to be varied in accordance with the said first condition to be sensed; a second variable capacitor arranged to be varied in accordance with the said second condition to be sensed; a first self-balancing means responsive to said first condition to be sensed including, a fixed capacitor, first and second sources of voltage, one of which is fixed during such normal measuring operation and the other of which is variable in accordance with said first condition to be sensed, a circuit arranged to be connected to said first variable capacitor and one of said sources of voltage and a further circuit including said fixed capacitor and the other of said sources of voltage, said circuits having a common impedance with respect to which said voltage sources are in opposition so that when the currents through the two circuits are the same no voltage appears across the said common impedance portion, a voltage responsive motor controlling means connected across said common impedance portion of said circuit, a motor controlled by said motor controlling means, means positioned by said motor to adjust said variable source of voltage in a direction to reduce the voltage impressed on said voltage responsive means until the latter is ineffective to cause operation of said motor; a second self-balancing means responsive to said second condition to be sensed including a fixed capacitor, first and second sources of voltage, one of which is fixed and the other of which is variable in accordance with the condition to be sensed, a circuit including said second variable capacitor and one of said sources of voltage and a further circuit including said fixed capacitor unit and the other said sources of voltage, said circuits having a common impedance portion with respect to which said voltage sources are in opposition so that when the currents through the two circuits are the same no voltage appears across said common impedance portion, a voltage responsive motor controlling means connected across said common impedance portion of said circuit, a motor controlled by said motor controlling means, means positioned by said motor to adjust said variable source of voltage in a direction to reduce the voltage impressed on said voltage responsive means until the latter is ineffective to cause operation of said motor; a ratio bridge having a first pair of terminals across which a potential is impressed and a conjugate pair of terminals across which an output voltage is taken, means to vary the output voltage between said conjugate pair of terminals comprising a variable resistance device under the control of said first self-balancing means motor and in series therewith, a second variable resistance device under the control of said second self-balancing means motor, a third variable resistance device having a movable tap, a fourth resistance device in series with said third variable resistance device, said third and fourth resistance devices being in series with said first pair of terminals, a voltage responsive motor controlling means connected across said ratio bridge output terminals, a motor controlled by said motor controlling means connected in operative relation with said movable tap to move said tap in a direction to reduce the said ratio bridge output voltage until the latter is ineffective to cause operation of said motor; a product bridge comprising a four arm Wheatstone bridge circuit in which one arm includes a variable resistance which is varied by said second self-balancing means motor, a second arm including a variable resistor which is varied by said ratio bridge rebalancing motor, a source of operating voltage applied to one pair of diagonal terminals of the bridge, voltage responsive means connected to the conjugate terminals of the bridge responsive to a difference in voltage thereacross, a motor controlled by said voltage responsive means, a rebalancing third arm including a variable resistor having a movable arm positioned by said motor to adjust said variable resistance in a direction to reduce the voltage impressed on said voltage responsive means until the latter is ineffective to cause operation of said product bridge motor, a fourth resistance arm in series with said third arm; and indicating means positioned by said product bridge motor.

References Cited in the file of this patent

UNITED STATES PATENTS

| | | |
|---|---|---|
| 1,706,968 | Schleicher | Mar. 26, 1929 |
| 2,349,860 | Hainer | May 30, 1944 |
| 2,431,696 | Keister | Dec. 2, 1947 |
| 2,453,607 | Whardle et al. | Nov. 9, 1948 |
| 2,539,616 | Gehman | Jan. 30, 1951 |
| 2,579,617 | Schaevitz | Dec. 25, 1951 |
| 2,584,897 | Marco | Feb. 5, 1952 |

FOREIGN PATENTS

| | | |
|---|---|---|
| 921,205 | France | Jan. 10, 1947 |